US012577338B2

(12) United States Patent
Lan et al.

(10) Patent No.: US 12,577,338 B2
(45) Date of Patent: *Mar. 17, 2026

(54) MULTISTAGE POLYMER

(71) Applicants: Dow Global Technologies LLC, Midland, MI (US); Rohm and Haas Company, Collegeville, PA (US)

(72) Inventors: Tian Lan, Langhorne, PA (US); Fanwen Zeng, Audubon, PA (US); Xiaodong Lu, North Wales, PA (US); Inna Shulman, Langhorne, PA (US); Tanvi S. Ratani, Pittsburgh, PA (US); Jason Fisk, Midland, MI (US); Tzu-Chi Kuo, Midland, MI (US)

(73) Assignees: Dow Global Technologies LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 944 days.

This patent is subject to a terminal disclaimer.

(21) Appl. No.: 17/768,948

(22) PCT Filed: Nov. 18, 2020

(86) PCT No.: PCT/US2020/060976

§ 371 (c)(1),
(2) Date: Apr. 14, 2022

(87) PCT Pub. No.: WO2021/101944

PCT Pub. Date: May 27, 2021

(65) Prior Publication Data

US 2024/0124630 A1 Apr. 18, 2024

Related U.S. Application Data

(60) Provisional application No. 62/938,464, filed on Nov. 21, 2019.

(51) Int. Cl.

| | |
|---|---|
| ***C08F 220/06*** | (2006.01) |
| ***C08F 220/18*** | (2006.01) |
| ***C08F 230/08*** | (2006.01) |
| ***C08F 265/06*** | (2006.01) |
| ***C09D 133/12*** | (2006.01) |
| ***C09D 133/14*** | (2006.01) |

(52) U.S. Cl.

CPC ...... *C08F 220/06* (2013.01); *C08F 220/1804* (2020.02); *C08F 230/08* (2013.01); *C08F 265/06* (2013.01); *C09D 133/12* (2013.01); *C09D 133/14* (2013.01); *C08F 2810/30* (2013.01)

(58) Field of Classification Search

CPC .............. C08F 220/1804; C08F 220/14; C08F 230/08; C08F 220/40; C08F 220/06; C08F 265/06; C09D 133/12; C09D 133/08; C09D 133/10; A61K 8/8152

See application file for complete search history.

(56) References Cited

U.S. PATENT DOCUMENTS

| | | | | |
|---|---|---|---|---|
| 4,743,667 A | 5/1988 | Mizutani et al. | | |
| 4,988,788 A | 1/1991 | Takarada | | |
| 5,852,095 A | 12/1998 | Yamauchi et al. | | |
| 6,060,072 A | 5/2000 | Konik et al. | | |
| 6,403,074 B1 | 6/2002 | Blankenburg et al. | | |
| 6,534,590 B1 * | 3/2003 | Aso | C09D 183/10 | 526/279 |
| 6,624,210 B1 * | 9/2003 | Petereit | A61K 9/2846 | 523/202 |
| 7,326,409 B2 | 2/2008 | Lemoine et al. | | |

(Continued)

FOREIGN PATENT DOCUMENTS

| | | | | |
|---|---|---|---|---|
| EP | 0378370 A2 | 7/1990 | | |
| EP | 0963751 A2 | 12/1999 | | |
| EP | 2181700 | 5/2010 | | |
| WO | 2012084598 | 6/2012 | | |
| WO | 2014083175 | 6/2014 | | |
| WO | WO-2014107867 A1 * | 7/2014 | C08F 2/22 | |
| WO | 2018144541 A1 | 8/2018 | | |
| WO | 2020076549 A1 | 4/2020 | | |
| WO | 2020123196 A1 | 6/2020 | | |
| WO | 2020123197 A1 | 6/2020 | | |

OTHER PUBLICATIONS

Rodriguez, "Correlation of Silicone Incorporation into Hybrid Acrylic Coatings with the Resulting Hydrophobic and Thermal Properties", Macromolecules, 2008, 41, pp. 8537-8546.

(Continued)

*Primary Examiner* — Karuna P Reddy

(74) *Attorney, Agent, or Firm* — Thomas S. Deibert

(57) ABSTRACT

A multistage polymer is provided, having: acrylate rich stage comprising: (a) structural units of monomer selected from $C_{1-22}$ alkyl (meth)acrylates and structural units of first carbosiloxane monomer of formula (I); and (b) carbosiloxane rich stage, comprising: structural units of second carbosiloxane monomer of formula (I); wherein a is 0 to 3; wherein d is 0 or 1; wherein $R^1$ is selected from hydrogen, $C_{1-10}$ alkyl group and aryl group; wherein $R^2$ is selected from hydrogen and $C_{1-10}$ alkyl group; wherein $R^8$ is —O—$Si(CH_3)_3$ group; wherein Y is selected from formula (II), (III) and (IV); wherein $R^4$ and $R^6$ are selected from hydrogen and methyl group; wherein $R^3$ and $R^5$ are a $C_{1-10}$ alkylene group; wherein $R^7$ is $C_{1-10}$ alkyl group; wherein b is 0 to 4 and wherein c is 0 or 1; and wherein the first and second carbosiloxane monomer of formula (I) are same or different.

17 Claims, No Drawings

(56) References Cited

U.S. PATENT DOCUMENTS

| | | | |
|---|---|---|---|
| 8,987,397 | B2 | 3/2015 | Kaneumi et al. |
| 9,486,399 | B2 | 11/2016 | Zeng et al. |
| 9,789,049 | B2 | 10/2017 | Zhang et al. |
| 10,047,199 | B2 | 8/2018 | Iimura et al. |
| 10,633,539 | B2 | 4/2020 | Phukan et al. |
| 10,683,434 | B2 | 6/2020 | Sandmeyer et al. |
| 10,968,321 | B2 | 4/2021 | Pandey et al. |
| 11,414,508 | B2 | 8/2022 | Taniguchi et al. |
| 2002/0120039 | A1 | 8/2002 | Furukawa et al. |
| 2006/0116495 | A1 | 6/2006 | Stark et al. |
| 2010/0310489 | A1 | 12/2010 | Barba |
| 2015/0231043 | A1 | 8/2015 | Sasaki |
| 2015/0290111 | A1 | 10/2015 | Fan et al. |
| 2016/0331672 | A1 | 11/2016 | Khachikian et al. |
| 2017/0260393 | A1 | 9/2017 | Phukan et al. |
| 2019/0062606 | A1 | 2/2019 | Schuh et al. |
| 2019/0345283 | A1 | 11/2019 | Yang et al. |
| 2020/0131708 | A1 * | 4/2020 | Triclot .................. D21H 19/20 |

OTHER PUBLICATIONS

Rodriguez, “Polymerization Strategies to Overcome Limiting Monomer Conversion in Silicone-Acrylic Miniemulsion Polymerization”, Polymer, 2008, 48, pp. 691-696.

Zhang, “A Novel Approach for the Preparation of Organiz-Siloxane Oligomers and the Creation of Hydrophobic Surface”, 2007, 254, 2, pp. 452-458.

Fei, “Influence of hard and soft monomer to silicon oxane/acrylate complex emulsion” Chinese Adhesives, 2019, vol. 28, No. 1, pp. 1-7.

* cited by examiner

MULTISTAGE POLYMER

The present invention relates to a multistage polymer. In particular, the present invention relates to a multistage polymer, comprising: an acrylate rich stage comprising: (a) structural units of monoethylenically unsaturated non-ionic, acrylate rich stage monomer selected from $C_{1-22}$ alkyl (meth)acrylates and mixtures thereof; and structural units of a first carbosiloxane monomer of formula (I); and (b) a carbosiloxane rich stage, comprising: structural units of a second carbosiloxane monomer of formula (I); wherein a is 0 to 3; wherein d is 0 or 1; wherein $R^1$ is selected from hydrogen, $C_{1-10}$ alkyl group and aryl group; wherein $R^2$ is selected from hydrogen and $C_{1-10}$ alkyl group; wherein $R^8$ is —O—$Si(CH_3)_3$ group; wherein Y is selected from formula (II), (III) and (IV); wherein $R^4$ and $R^6$ are selected from hydrogen and methyl group; wherein $R^3$ and $R^5$ are a $C_{1-10}$ alkylene group; wherein $R^7$ is $C_{1-10}$ alkyl group; wherein b is 0 to 4; wherein c is 0 or 1; and wherein the first carbosiloxane monomer of formula (I) and the second carbosiloxane monomer of formula (I) are the same or different.

Silicone containing polymers have been proposed for and used in coatings, personal care, and home care industries. In coatings formulations, silicone containing polymers offer the potential for general modification of surface properties as these polymers may impart water and oil repellency, stain resistance, barrier properties, surfactant properties and lubricity to the formulated coating. In personal care formulations, silicone containing polymers offer performance improvements and desirable sensory properties for the formulated product.

Attempts to design silicone containing polymers and to incorporate the same into formulated products; however, have been met with significant challenges. The silicone containing polymers are frequently incompatible with other ingredients of the formulated products, such as, polar polymers and other ingredients typically contained in coating formulations and home and personal care compositions. Hence, auxiliary additives are typically employed to compatibilize the silicone containing polymer with the other components in the formulated product to impede phase separation of the key components during storage.

An approach to providing silicone containing polymers that provide improved compatibility for cosmetic formulations is disclosed by Blankenburg et al. in U.S. Pat. No. 6,403,074. In U.S. Pat. No. 6,403,074, Blankenburg et al. disclose a water-soluble or water-dispersible polymer which is obtained by subjecting (a) ethylenically unsaturated monomers to free-radical polymerization in the presence of (b) polyalkylene oxide-containing silicone derivatives of the formula

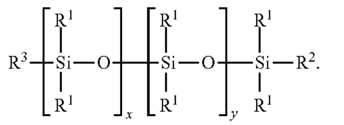

Notwithstanding, there remains a need for new silicone containing polymers that provide formulational design flexibility and compatibilization for use in a variety of coating formulations, personal care formulations and home care formulations.

The present invention provides a multistage polymer, comprising: (a) an acrylate rich stage comprising: 38 to <100 wt %, based on weight of the acrylate rich stage, of structural units of a monoethylenically unsaturated non-ionic, acrylate rich stage monomer, wherein the monoethylenically unsaturated non-ionic, acrylate rich stage monomer is selected from the group consisting of $C_{1-22}$ alkyl (meth)acrylates and mixtures thereof; >0 to 50 wt %, based on weight of the acrylate rich stage, of structural units of a first carbosiloxane monomer of formula (I)

(I)

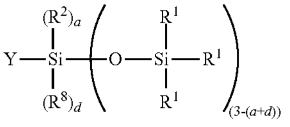

0 to 10 wt %, based on weight of the acrylate rich stage, of structural units of a monoethylenically unsaturated carboxylic acid, acrylate rich stage monomer; and 0 to 2 wt %, based on weight of the acrylate rich stage, of structural units of a multiethylenically unsaturated, acrylate rich stage monomer having at least two ethylenically unsaturated groups per molecule; and (b) a carbosiloxane rich stage, comprising: 0 to 90 wt %, based on weight of the carbosiloxane rich stage, of structural units of a vinyl monomer; and 10 to 100 wt %, based on weight of the carbosiloxane rich stage, of structural units of a second carbosiloxane monomer of formula (I)

(I)

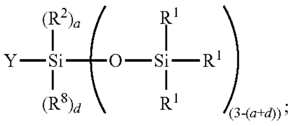

wherein a is 0 to 3; wherein d is 0 or 1; wherein each $R^1$ is independently selected from the group consisting of a hydrogen, a $C_{1-10}$ alkyl group and an aryl group; wherein each $R^2$ is independently selected from the group consisting of a hydrogen and a $C_{1-10}$ alkyl group; wherein each $R^8$ is a —O—$Si(CH_3)_3$ group; wherein Y is selected from the group consisting of formula (II), (III) and (IV)

(II)

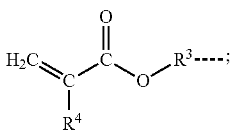

(III)

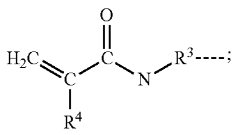

and (IV)

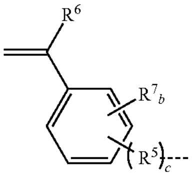

wherein each $R^4$ and $R^6$ are independently selected from the group consisting of a hydrogen and a methyl group; wherein each $R^3$ and $R^5$ are independently a $C_{1-10}$ alkylene group; wherein each $R^7$ is independently a $C_{1-10}$ alkyl group; wherein b is 0 to 4 and wherein c is 0 or 1; and wherein the first carbosiloxane monomer of formula (I) and the second carbosiloxane monomer of formula (I) are the same or different.

The present invention provides a composition, comprising a multistage polymer of the present invention, wherein the composition is selected from the group consisting of a personal care formulation, a home care formulation, a coating, an oilfield servicing fluid, a civil engineering servicing fluid, a construction formulation and a pharmaceutical formulation.

DETAILED DESCRIPTION

We have identified a unique multistage polymer for use in a variety of compositions, wherein the desirable properties imparted via incorporation of silicone containing polymer can be tailored to facilitate compatibilization with the other components in such compositions.

Unless otherwise indicated, ratios, percentages, parts, and the like are by weight.

The term "aesthetic characteristics" as used herein and in the appended claims in reference to a personal care formulation refers to visual and tactile sensory properties (e.g., smoothness, tack, lubricity, texture, color, clarity, turbidity, uniformity).

The term "structural units" as used herein and in the appended claims refers to the remnant of the indicated monomer in the claimed polymer; thus a structural unit of n-butyl acrylate is illustrated:

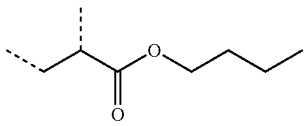

where the dotted lines represent the points of attachment to the polymer backbone.

The term "(meth)acrylic acid" as used herein and in the appended claims is intended to serve as a generic expression embracing both acrylic acid and methacrylic acid.

The term "(meth)acrylate" as used herein and in the appended claims is intended to serve as a generic expression embracing both acrylate and methacrylate.

The term "cosmetically acceptable" as used herein and in the appended refers to ingredients that are typically used for topical application to the skin and is intended to underscore that materials that are toxic when present in the amounts typically found in skin care compositions are not contemplated as part of the present invention.

Preferably, the multistage polymer of the present invention, comprises: (a) (preferably, 60 to 95 wt %; more preferably, 65 to 90 wt %; still more preferably, 70 to 85 wt %; most preferably, 75 to 82 wt %), based on weight of the multistage polymer, of) an acrylate rich stage comprising: 38 to <100 wt % (preferably, 44 to 99.39 wt %; more preferably, >77 to 98.73 wt %; still more preferably, 78.9 to 97.95 wt %; most preferably, 82.17 to 94.68 wt %), based on weight of the acrylate rich stage, of structural units of a monoethylenically unsaturated non-ionic, acrylate rich stage monomer, wherein the monoethylenically unsaturated non-ionic, acrylate rich stage monomer is selected from the group consisting of $C_{1-22}$ alkyl (meth)acrylates and mixtures thereof; >0 to 50 wt % (preferably, 0.1 to 50 wt %; more preferably, 0.5 to <20 wt %; still more preferably, 1 to 19 wt % most preferably, 4 to 16 wt %), based on weight of the acrylate rich stage, of structural units of a first carbosiloxane monomer of formula (I)

(I)

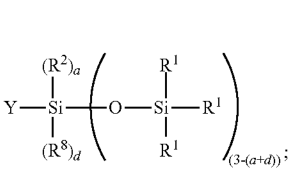

0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; and 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; and (b) (preferably, 5 to 40 wt %; more preferably, 10 to 35 wt %; still more preferably, 15 to 30 wt %; most preferably, 18 to 25 wt %), based on weight of the multistage polymer, of) a carbosiloxane rich stage, comprising: 0 to 90 wt % (preferably, 10 to <50 wt %; more preferably, 12.5 to 30 wt %; still more preferably, 15 to 25 wt %; most preferably, 19 to 21 wt %), based on weight of the carbosiloxane rich stage, of structural units of a vinyl monomer; and 10 to 100 wt % (preferably, >50 to 90 wt %; more preferably, 70 to 87.5 wt %; still more preferably, 75 to 85 wt %; most preferably, 79 to 81 wt %), based on weight of the carbosiloxane rich stage, of structural units of a carbosiloxane monomer of formula (I)

(I)

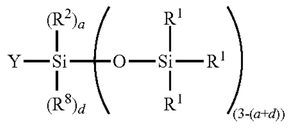

wherein a is 0 to 3 (preferably, 0 to 2; most preferably, 1); wherein d is 0 or 1 (preferably, 0); wherein each $R^1$ is independently selected from the group consisting of a hydrogen, a $C_{1-10}$ alkyl group and an aryl group (preferably, a hydrogen and a $C_{1-10}$ alkyl group; more preferably, a hydrogen and a $C_{1-4}$ alkyl group; still more preferably, a hydrogen and a methyl group; most preferably, a methyl group); wherein each $R^2$ is independently selected from the group consisting of a hydrogen and a $C_{1-10}$ alkyl group (preferably, a hydrogen and a $C_{1-5}$ alkyl group; more preferably, a hydrogen and a $C_{1-4}$ alkyl group; still more preferably, a hydrogen and a methyl group; most preferably, a methyl group); wherein each $R^8$ is a —O—$Si(CH_3)_3$ group; wherein Y is selected from the group consisting of formula (II), (III) and (IV) (preferably, (II) or (III); most preferably, (II))

(II)

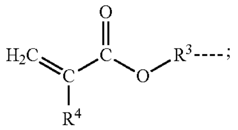

(III)

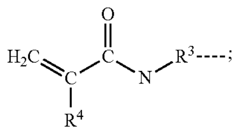

and (IV)

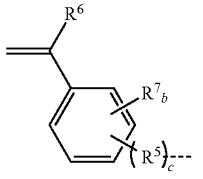

wherein each $R^4$ and $R^6$ are independently selected from the group consisting of a hydrogen and a methyl group (preferably, a methyl group); wherein each $R^3$ and $R^5$ are independently a $C_{1-10}$ alkylene group (preferably, a $C_{1-7}$ alkylene group; more preferably, a $C_{2-6}$ alkylene group; still more preferably, a $C_{3-5}$ alkylene group; most preferably, a $C_3$ alkylene group (e.g., $—CH_2—CH_2—CH_2—$)); wherein each $R^7$ is independently a $C_{1-10}$ alkyl group; wherein b is 0 to 4; wherein c is 0 or 1; and wherein the first carbosiloxane monomer of formula (I) and the second carbosiloxane monomer of formula (I) are the same or different (preferably, wherein the first carbosiloxane monomer of formula (I) and the second carbosiloxane monomer of formula (I) are the same) (preferably, wherein the multistage polymer is an emulsion polymer) (more preferably, wherein the multistage polymer is an emulsion polymer, comprising an acrylate rich stage as a first stage and a carbosiloxane rich stage as a second stage).

Preferably, the multistage polymer of the present invention comprises an acrylate rich stage. More preferably, the multistage polymer of the present invention, comprises: 60 to 95 wt % (preferably, 65 to 90 wt %; more preferably, 70 to 85 wt %; preferably, 75 to 82 wt %), based on weight of the multistage polymer, of an acrylate rich stage. Most preferably, the multistage polymer of the present invention, comprises: 60 to 95 wt % (preferably, 65 to 90 wt %; more preferably, 70 to 85 wt %; preferably, 75 to 82 wt %), based on weight of the multistage polymer, of an acrylate rich stage; wherein the acrylate rich stage, comprises: 38 to <100 wt % (preferably, 44 to 99.39 wt %; more preferably, >77 to 98.73 wt %; still more preferably, 78.9 to 97.95 wt %; most preferably, 82.17 to 94.68 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of $C_{1-22}$ alkyl (meth)acrylates and mixtures thereof; >0 to 50 wt % (preferably, 0.1 to 50 wt %; more preferably, 0.5 to <20 wt %; still more preferably, 1 to 19 wt % most preferably, 4 to 16 wt %), based on weight of the acrylate rich stage, of structural units of a first carbosiloxane monomer of formula (I); 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; and 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule.

Preferably, the acrylate rich stage comprises: 63 to 99.9 wt % (preferably, >74 to 98.49 wt %; more preferably, 80.4 to 96.95 wt %; most preferably, 82.17 to 94.68 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of $C_{1-22}$ alkyl (meth)acrylates and mixtures thereof. More preferably, the acrylate rich stage comprises: 63 to 99.9 wt % (preferably, >74 to 98.49 wt %; more preferably, 80.4 to 96.95 wt %; most preferably, 82.17 to 94.68 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of at least two $C_{1-8}$ alkyl (meth)acrylates. Still more preferably, the acrylate rich stage comprises: 63 to 99.9 wt % (preferably, >74 to 98.49 wt %; more preferably, 80.4 to 96.95 wt %; most preferably, 82.17 to 94.68 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of at least two $C_{1-4}$ alkyl (meth) acrylates. Yet more preferably, the acrylate rich stage comprises: 63 to 99.9 wt % (preferably, >74 to 98.49 wt %; more preferably, 80.4 to 96.95 wt %; most preferably, 82.17 to 94.68 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of at least three $C_{1-4}$ alkyl (meth)acrylates. Most preferably, the acrylate rich stage comprises: 63 to 99.9 wt % (preferably, >74 to 98.49 wt %; more preferably, 80.4 to 96.95 wt %; most preferably, 82.17 to 94.68 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of at least three $C_{1-4}$ alkyl (meth)acrylates; wherein the mixture includes butyl acrylate, butyl methacrylate and methyl methacrylate.

Preferably, the acrylate rich stage comprises: >0 to 50 wt % (preferably, 0.1 to 50 wt %; more preferably, 0.5 to <20 wt %; still more preferably, 1 to 19 wt % most preferably, 4 to 16 wt %), based on weight of the acrylate rich stage, of a first carbosiloxane monomer of formula (I). More preferably, the acrylate rich stage comprises: >0 to 50 wt % (preferably, 0.1 to 50 wt %; more preferably, 0.5 to <20 wt %; still more preferably, 1 to 19 wt % most preferably, 4 to 16 wt %), based on weight of the acrylate rich stage, of a first carbosiloxane monomer of formula (I), wherein a is 0 to 3 (preferably, 0 to 2; more preferably, 1); wherein d is 0 or 1 (preferably, 0); wherein each $R^1$ is independently selected from the group consisting of a hydrogen, a $C_{1-10}$ alkyl group and an aryl group (preferably, a hydrogen and a $C_{1-10}$ alkyl group; more preferably, a hydrogen and a $C_{1-4}$ alkyl group; still more preferably, a hydrogen and a methyl group; most preferably, a methyl group); wherein each $R^2$ is independently selected from the group consisting of a hydrogen and a $C_{1-10}$ alkyl group (preferably, a hydrogen and a $C_{1-5}$ alkyl group; more preferably, a hydrogen and a $C_{1-4}$ alkyl group; still more preferably, a hydrogen and a methyl group; most preferably, a methyl group); wherein each $R^8$ is a —O—Si$(CH_3)_3$ group; wherein Y is selected from the group consisting of formula (II), (III) and (IV) (preferably, (II) or (III); more preferably, (II)); wherein each $R^4$ and $R^6$ are independently selected from the group consisting of a hydrogen and a methyl group (preferably, a methyl group); wherein each $R^3$ and $R^5$ are independently a $C_{1-10}$ alkylene group (preferably, a $C_{1-7}$ alkylene group; more preferably, a $C_{2-6}$ alkylene group; still more preferably, a $C_{3-5}$ alkylene group; most preferably, a $C_3$ alkylene group (e.g., —$CH_2$—$CH_2$—$CH_2$—)); wherein each $R^7$ is independently a $C_{1-10}$ alkyl group; wherein b is 0 to 4 and wherein c is 0 or 1. Most preferably, the carbosiloxane rich stage comprises: >0 to 50 wt % (preferably, 0.1 to 50 wt %; more preferably, 0.5 to <20 wt %; still more preferably, 1 to 19 wt % most preferably, 4 to 16 wt %), based on weight of the acrylate rich stage, of structural units of a first carbosiloxane monomer of formula (I), wherein a is 1; wherein d is 0; wherein each $R^1$ is a methyl group; wherein each $R^2$ is a methyl group; wherein Y is of formula (II); wherein each $R^3$ is a $C_{3-5}$ alkylene group; and wherein each $R^4$ is a methyl group.

Preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer. More preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is selected from the group consisting of (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate, other derivatives (such as corresponding anhydride, amides and esters) and mixtures thereof. Still more preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is selected from the group consisting of acrylic acid, methacrylic acid, itaconic acid, crotonic acid and mixtures thereof. Yet more preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is selected from the group consisting of at least one of acrylic acid and methacrylic acid. Most preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is methacrylic acid.

Preferably, the acrylate rich stage comprises: 0 to 2 wt % (preferably, 0.01 to 1 wt %; more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule. More preferably, the acrylate rich stage comprises: 0 to 2 wt % (preferably, 0.01 to 1 wt %; more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is selected from the group consisting of divinylaromatic compounds, di-(meth)acrylate esters, tri-(meth)acrylate esters, tetra-(methacrylate)esters, di-allyl ethers, tri-allyl ethers, tetra-allyl ethers, di-allyl esters, tri-allyl esters, tetra-allyl esters, allyl (meth)acrylate and mixtures thereof. Still more preferably, the acrylate rich stage comprises: 0 to 2 wt % (preferably, 0.01 to 1 wt %; more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is selected from the group consisting of divinylbenzene (DVB), trimethylolpropane diallyl ether, tetra-allyl pentaerythritol, triallyl pentaerythritol, diallyl pentaerythritol, dially phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA), butylene glycol dimethacrylate (BGDMA) and mixtures thereof. Yet more preferably, the acrylate rich stage comprises: 0 to 2 wt % (preferably, 0.01 to 1 wt %; more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is selected from the group consisting of DVB, ALMA, EGDMA, HDDA and BGDMA. Yet still more preferably, the acrylate rich stage comprises: 0 to 2 wt % (preferably, 0.01 to 1 wt %; more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule includes ALMA. Most preferably, the acrylate rich stage comprises: 0 to 2 wt % (preferably, 0.01 to 1 wt %; more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is ALMA.

Preferably, the multistage polymer of the present invention comprises a carbosiloxane rich stage. More preferably, the multistage polymer of the present invention, comprises: 5 to 40 wt % (preferably, 10 to 35 wt %; more preferably, 15 to 30 wt %; preferably, 18 to 25 wt %), based on weight of the multistage polymer, of a carbosiloxane rich stage. Most preferably, the multistage polymer of the present invention, comprises: 5 to 40 wt % (preferably, 10 to 35 wt %; more preferably, 15 to 30 wt %; preferably, 18 to 25 wt %), based on weight of the multistage polymer, of a carbosiloxane rich stage; wherein the carbosiloxane rich stage comprises: 0 to 90 wt % (preferably, 10 to <50 wt %; more preferably, 12.5 to 30 wt %; still more preferably, 15 to 25 wt %; most preferably, 19 to 21 wt %), based on weight of the carbosiloxane rich stage, of structural units of a vinyl monomer; and 10 to 100 wt % (preferably, >50 to 90 wt %; more preferably, 70 to 87.5 wt %; still more preferably, 75 to 85 wt %; most preferably, 79 to 81 wt %), based on weight of the carbosiloxane rich stage, of structural units of a second carbosiloxane monomer of formula (I).

Preferably, the carbosiloxane rich stage comprises: 0 to 90 wt % (preferably, 10 to <50 wt %; more preferably, 12.5 to 30 wt %; still more preferably, 15 to 25 wt %; most preferably, 19 to 21 wt %), based on weight of the carbosiloxane rich stage, of structural units of a vinyl monomer. More preferably, the carbosiloxane rich stage comprises: 0 to 90 wt % (preferably, 10 to <50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer contains at least one radically polymerizable vinyl group per molecule. Still more preferably, the carbosiloxane rich stage comprises: 0 to 90 wt % (preferably, 10 to <50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer is selected from the group consisting of $C_{1-3}$ alkyl acrylates (e.g., methyl acrylate, ethyl acrylate, n-propyl acrylate, isopropyl acrylate); $C_{1-3}$ alkyl methacrylates (e.g., methyl methacrylate, ethyl methacrylate, n-propyl methacrylate, isopropyl methacrylate); monoethylenically unsaturated carboxylic acids (e.g., (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate); $C_{4-20}$ alkyl acrylates (e.g., n-butyl acrylate, isobutyl acrylate, tert-butyl acrylate, n-hexyl acrylate, cyclohexyl acrylate, 2-ethylhexyl acrylate, octyl acrylate, lauryl acrylate, stearyl acrylate); $C_{4-20}$ alkyl methacrylates (e.g., n-butyl methacrylate, isobutyl methacrylate, tert-butyl methacrylate, n-hexyl methacrylate, cyclohexyl methacrylate, 2-ethylhexyl methacrylate, octyl methacrylate, lauryl methacrylate, stearyl methacrylate); aromatic vinyl monomers (e.g., styrene, vinyl toluene, benzyl acrylate, benzyl methacrylate, phenoxyethyl acrylate, phenoxyethyl methacrylate, vinyl pyrrolidone); and mixtures thereof. Yet more preferably, the carbosiloxane rich stage comprises: 0 to 90 wt % (preferably, 10 to <50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer is selected from the group consisting of methyl acrylate, ethyl acrylate, n-propyl acrylate, isopropyl acrylate, methyl methacrylate, ethyl methacrylate, n-propyl methacrylate, isopropyl methacrylate, n-butyl acrylate, isobutyl acrylate, tert-butyl acrylate, n-hexyl acrylate, cyclohexyl acrylate, 2-ethylhexyl acrylate, n-butyl methacrylate, isobutyl methacrylate, tert-butyl methacrylate, n-hexyl methacrylate, 2-ethylhexyl methacrylate, methacrylic acid and mixtures thereof. Most preferably, the carbosiloxane rich stage comprises: 0 to 90 wt % (preferably, 10 to <50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer includes methyl methacrylate and methacrylic acid.

Preferably, the carbosiloxane rich stage comprises: 10 to 100 wt % (preferably, >50 to 90 wt %; more preferably, 70 to 87.5 wt %; still more preferably, 75 to 85 wt %; most preferably, 79 to 81 wt %), based on weight of the carbosiloxane rich stage, of structural units of a second carbosiloxane monomer of formula (I). More preferably, the carbosiloxane rich stage comprises: 10 to 100 wt % (preferably, >50 to 90 wt %; more preferably, 70 to 87.5 wt %; still more preferably, 75 to 85 wt %; most preferably, 79 to 81 wt %), based on weight of the carbosiloxane rich stage, of structural units of a second carbosiloxane monomer of formula (I), wherein a is 0 to 3 (preferably, 0 to 2; more preferably, 1); wherein d is 0 or 1 (preferably, 0); wherein each $R^1$ is independently selected from the group consisting of a hydrogen, a $C_{1-10}$ alkyl group and an aryl group (preferably, a hydrogen and a $C_{1-10}$ alkyl group; more preferably, a hydrogen and a $C_{1-4}$ alkyl group; still more preferably, a hydrogen and a methyl group; most preferably, a methyl group); wherein each $R^2$ is independently selected from the group consisting of a hydrogen and a $C_{1-10}$ alkyl group (preferably, a hydrogen and a $C_{1-5}$ alkyl group; more preferably, a hydrogen and a $C_{1-4}$ alkyl group; still more preferably, a hydrogen and a methyl group; most preferably, a methyl group); wherein each $R^8$ is a —O—$Si(CH_3)_3$ group; wherein Y is selected from the group consisting of formula (II), (III) and (IV) (preferably, (II) or (III); more preferably, (II)); wherein each $R^4$ and $R^6$ are independently selected from the group consisting of a hydrogen and a methyl group (preferably, a methyl group); wherein each $R^3$ and $R^5$ are independently a $C_{1-10}$ alkylene group (preferably, a $C_{1-7}$ alkylene group; more preferably, a $C_{2-6}$ alkylene group; still more preferably, a $C_{3-5}$ alkylene group; most preferably, a $C_3$ alkylene group (e.g., —$CH_2$—$CH_2$—$CH_2$—)); wherein each $R^7$ is independently a $C_{1-10}$ alkyl group; wherein b is 0 to 4 and wherein c is 0 or 1. Most preferably, the carbosiloxane rich stage comprises: 10 to 100 wt % (preferably, >50 to 90 wt %; more preferably, 70 to 87.5 wt %; still more preferably, 75 to 85 wt %; most preferably, 79 to 81 wt %), based on weight of the carbosiloxane rich stage, of structural units of a second carbosiloxane monomer of formula (I), wherein a is 1; wherein d is 0; wherein each $R^1$ is a methyl group; wherein each $R^2$ is a methyl group; wherein Y is of formula (II); wherein each $R^3$ is a $C_{3-5}$ alkylene group; and wherein each $R^4$ is a methyl group.

Preferably, the composition of the present invention comprises a multistage polymer of the present invention. More preferably, the composition of the present invention comprises: 0.1 to 10 wt % (preferably, 0.5 to 7.5 wt %; more preferably, 1 to 7 wt %; still more preferably, 3 to 6 wt %; most preferably, 4 to 5 wt %), based on weight of the personal care formulation, of a multistage polymer of the present invention. Most preferably, the composition of the present invention comprises: 0.1 to 10 wt % (preferably, 0.5 to 7.5 wt %; more preferably, 1 to 7 wt %; still more preferably, 3 to 6 wt %; most preferably, 4 to 5 wt %), based on weight of the personal care formulation, of a multistage polymer of the present invention; wherein the multistage polymer, comprising an acrylate rich stage and a carbosiloxane rich stage.

Preferably, composition of the present invention is selected from the group consisting of a personal care formulation (e.g., hair care formulation, a skin care formulation, a sun care formulation, a nail care formulation, a pet care formulation, an antiperspirant/deodorant formulation, a color cosmetic formulation); a home care formulation; a coating; an oilfield servicing fluid; a civil engineering servicing fluid; a construction formulation and a pharmaceutical formulation.

Preferably, composition of the present invention, further comprises a carrier. More preferably, the composition of the present invention, comprises 0.1 to 99.9 wt % (preferably, 10 to 95 wt %; more preferably, 25 to 90 wt %; more preferably, 40 to 80 wt %), based on weight of the composition, of a carrier. Most preferably, the composition of the present invention, comprises 0.1 to 99.9 wt % (preferably, 10 to 95 wt %; more preferably, 25 to 90 wt %; more preferably, 40 to 80 wt %), based on weight of the composition, of a carrier; wherein the multistage polymer is dispersed in the carrier.

Preferably, composition of the present invention, further comprises 0.1 to 99.9 wt % (preferably, 10 to 95 wt %; more preferably, 25 to 90 wt %; more preferably, 40 to 80 wt %), based on weight of the composition, of a carrier is selected from the group consisting of water; emulsions (e.g., oil-in-water emulsion, water-in-oil emulsion); alcohols (e.g., $C_{1-4}$ straight or branched chain alcohols such as ethyl alcohol, propyl alcohol, isopropyl alcohol, butyl alcohol); glycols (e.g., ethylene glycol, propylene glycol, butylene glycol, pentylene glycol, hexylene glycol, dipropylene glycol, ethoxydiglycol); glycerin; butyl cellosolve and mixtures thereof. More preferably, the composition of the present invention, comprises 0.1 to 99.9 wt % (preferably, 10 to 95 wt %; more preferably, 25 to 90 wt %; more preferably, 40 to 80 wt %), of a carrier; wherein the carrier includes water.

Preferably, the composition of the present invention is a personal care formulation. More preferably, the composition of the present invention is a personal care formulation selected from the group consisting of a hair care formulation, a skin care formulation, a sun care formulation, a nail care formulation, a pet care formulation, an antiperspirant/deodorant formulation and a color cosmetic formulation. Preferably, the composition of the present invention is a personal care formulation selected from the group consisting of a hair care formulation, a skin care formulation, a sun care formulation, a nail care formulation, a pet care formulation, an antiperspirant/deodorant formulation and a color cosmetic formulation; wherein the personal care formulation further comprises a cosmetically acceptable carrier; wherein the cosmetically acceptable carrier is selected to be capable of evaporating upon application of the personal care formulation to mammalian skin and/or hair.

Preferably, the composition of the present invention is a personal care formulation, wherein the personal care formulation further comprises at least one personal care active selected from the group consisting of a water proofing agent, an emollient, a preservative, an antioxidant, a fragrance, a deodorant, an antiperspirant active, a skin coolant, a humectant, a rheology modifier, an aesthetic modifier, a vitamin, a skin protectant, an oil, an emulsifier, a surfactant, a pearlizer, a consistency factor, a thickener, a super fatting agent, a stabilizer, a polymer, a silicone oil, a fat, a wax, a lecithin, a phospholipid, a filler, a light management powder or particle, a moisturizer, a cleanser, a sun care active, a hair treatment active, an anti-dandruff agent, a colorant and a skin care active.

Preferably, the composition of the present invention is a coating. More preferably, the composition of the present invention is a coating, wherein the coating, further comprises at least one coating component selected from the group consisting of a film forming binder, an opacifier, a pigment, a rheology modifier, a wetting agent and a metal oxide.

Preferably, the composition of the present invention is a home care formulation. More preferably, the composition of the present invention is a home care formulation, wherein the home care formulation, further comprises at least one home care active ingredient selected from the group consisting of a fragrance, an insect repellent, a deodorizer, a cleaning agent, a disinfecting agent, a laundry detergent, a laundry softening agent, a dishwashing detergent, a toilet bowl cleaning agent, a fabric sizing agent, a lubricating agent and a textile wipe.

Preferably, the composition of the present invention is an oilfield servicing fluid. More preferably, the composition of the present invention is an oilfield servicing fluid, wherein the oilfield servicing fluid, further comprises at least one of a clay, a xanthan gum, a starch, a polymer, an acid soluble carbonate salt, a sodium chloride and a rheology modifier.

Preferably, the composition of the present invention is a construction formulation. More preferably, the composition of the present invention is a construction formulation, wherein the construction formulation, further comprises at least one of a cement, a concrete, an adhesive, a plaster, a mortar, a joint compound, a clay and a mica.

Preferably, the composition of the present invention is a pharmaceutical formulation. More preferably, the composition of the present invention is a pharmaceutical formulation; wherein the pharmaceutical formulation further comprises a pharmaceutically acceptable carrier; wherein the pharmaceutically acceptable carrier is selected to be capable of evaporating upon application of the pharmaceutical formulation to mammalian tissue or hair.

Preferably, the composition of the present invention is a pharmaceutical formulation, wherein the pharmaceutical formulation, further comprises at least one of an excipient, a biological active, a tableting material, an inactive ingredient, a binding agent, a time release agent, a flavoring agent and a colorant.

The multistage polymer of the present invention can be prepared by conventional polymerization techniques, such as, for example, by emulsion polymerization. Aqueous emulsion polymerization processes are typically conducted in an aqueous reaction mixture, which contains at least one monomer and various synthesis adjuvants, such as free radical sources, buffers, chain transfer agents and reductants in an aqueous reaction medium. Preferably, the multistage polymer of the present invention is an emulsion polymer. More preferably, the multistage polymer of the present invention is an emulsion polymer, wherein the acrylate rich stage is a first stage of the emulstion polymer and the carboxiloxane rich stage is a second stage of the emulsion polymer.

Some embodiments of the present invention will now be described in detail in the following Examples.

The monomer abbreviations used in the Examples are described in Table 1.

TABLE 1

| Abbreviation | Monomer |
|---|---|
| BA | Butyl Acrylate |
| BMA | Butyl Methacrylate |
| MMA | Methyl Methacrylate |
| MAA | Methacrylic Acid |
| ALMA | Allyl Methacrylate |
| MD'M-ALMA | 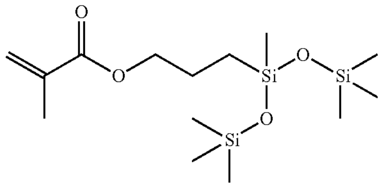 [SMILES: C=C(C)C(=O)OCCC[Si](C)(O[Si](C)(C)C)O[Si](C)(C)C] |

Example SC: Multistage Polymer

A 2-liter round-bottom flask (equipped with an overhead stirrer, thermocouple, condenser and inlets for the addition of monomer and initiators) was charged with deionized water (262.0 g), 50% CAVASOL™ W7 MTL (cyclodextrin from Wacker Fine Chemicals) (15.2 g), 31.5% Aerosol™ A102 surfactant (20.5 g) (from Solvay) and sodium carbonate (3.4 g). The flask contents were stirred and heated to 85° C.

An acrylate rich monomer emulsion was prepared by charging deionized water (294.9 g) and 31.5% Aerosol™ A102 surfactant (8.7 g) to a first container and set to stir. Once the surfactant was incorporated into the water the following monomers were added slowly to the first container with continued stirring: BA (182.4 g), BMA (264.5 g), MMA (152.0 g), MAA (9.1 g) and ALMA (0.5 g).

A carbosiloxane rich monomer emulsion was prepared by charging deionized water (76.0 g) and 31.5% Aerosol™ A102 surfactant (2.2 g) to a second container and set to stir. Once the surfactant was incorporated into the water the following monomers were added slowly to the second container with continued stirring: MD'M-ALMA (121.6 g), MMA (28.1 g) and MAA (2.3 g). The carboxiloxane rich monomer emulsion was further emulsified using the homogenization at 7,000 rpm for 10 min.

A cofeed catalyst solution was prepared containing sodium persulfate (1.5 g) and deionized water (40.3 g).

A cofeed buffer solution was prepared containing sodium carbonate (1.5 g) and deionized water (40.3 g).

At a reaction set point temperature of 85° C., 34.2 g of the acrylate rich monomer emulsion from the first container along with a deionized water rinse (15.2 g) was charged to the flask contents. An initiator solution of sodium persulfate (3.4 g) in deionized water (15.2 g) was then added to the flask contents. After the initial polymerization, the remainder of the acrylate rich monomer emulsion in the first container was cofeed to the flask contents at a rate of 6.05 g/min. for 15 minutes and then at 13.01 g/min for 60 minutes. Simultaneously with the acrylate rich monomer emulsion cofeed, the cofeed catalyst solution and the cofeed buffer solution were added to the reactor contents at a rate of 0.44 g/min. for 95 minutes.

Following the addition of the acrylate rich monomer emulsion, the carbosiloxane rich monomer emulsion in the second container was added to the reactor contents at a rate of 11.51 g/min for 20 minutes. After completion of the various feeds, the contents of the flask were chased to reduce the amount of residual monomers, providing the product multistage polymer.

Examples S1-S4: Multistage Polymer

Multistage polymers were prepared substantially as described in Example SC the appropriate changes being made reflecting the total wt % of the acrylate rich stage and the carbosiloxane rich stage in the respective multistage polymers of Examples S1-S4 with the acrylate rich stage monomers and the carbosiloxane rich stage monomers in the respective stages as noted in Table 2.

TABLE 2

| | Multistage polymer | | | | | | | | | | |
|---|---|---|---|---|---|---|---|---|---|---|---|
| | Acrylate rich stage | | | | | | | Carbosiloxane rich stage | | | |
| | | Monomer (wt %) | | | | | | | Monomer (wt %) | | |
| Ex | Total wt % | BA | BMA | MMA | MAA | MD'M-ALMA | ALMA | Total wt % | MAA | MMA | MD'M-ALMA |
| SC | 80 | 30 | 43.5 | 25 | 1.5 | — | 0.075 | 20 | 1.5 | 18.5 | 80 |
| S1 | 80 | 25 | 43.5 | 25 | 1.5 | 5 | 0.075 | 20 | 1.5 | 18.5 | 80 |
| S2 | 80 | 20 | 43.5 | 25 | 1.5 | 10 | 0.075 | 20 | 1.5 | 18.5 | 80 |
| S3 | 80 | 15 | 43.5 | 25 | 1.5 | 15 | 0.075 | 20 | 1.5 | 18.5 | 80 |
| S4 | 80 | 10 | 43.5 | 25 | 1.5 | 20 | 0.075 | 20 | 1.5 | 18.5 | 80 |

Polymer Properties

The product multistage polymers prepared according to Comparative Example SC and Examples S1-S4 were analyzed for percent solids, pH, mean particle size (using Brookhaven Instruments BI-90 particle size analyzer) and glass transition temperature, $T_g$, as measured using a TA instruments model 2920 Differential Scanning calorimeter (DSC). The results are provided in TABLE 3.

TABLE 3

| Test Material Example | % solids | pH | PS (nm) | Tg (° C.) |
|---|---|---|---|---|
| SC | 44.4 | 6.5 | 134 | 11 |
| S1 | 44.0 | 5.5 | 132 | 19 |
| S2 | 46.0 | 6.2 | 119 | 13 |
| S3 | 44.1 | 6.1 | 134 | 16 |
| S4 | 44.0 | 6.3 | 158 | 22 |

Neat Polymer Film Mechanical Properties

Film mechanical properties were evaluated by tensile test to determine film tensile strength, toughness and flexibility. The neat polymer film was prepared by casting 20 g of the polymer produced according to each of Comparative Example SC and Examples S1-S4 in a 9.4 cm diameter petri dish. The polymer latex was air dried in an environmental controlled room (72° F., 50% RH) until a dried film formed. The dried film was then peeled off from the petri dish and cut into 3 dog bone pieces with neck part at 0.75 inch long and 0.25 inch wide. The dog bone pieces were then tested in an environmental controlled room (72° F., 50% RH) by using an INSTRON 5565 Tensile Tester with stretch speed at 10 inch/min. The results of the tensile test are provided in TABLE 4.

TABLE 4

| Test | Mechanical Properties | | |
|---|---|---|---|
| Material Example | Tensile stress at break (psi) | Toughness | Tensile strain at break (%) |
| Control* | 110.0 | 440.0 | 726.0 |
| SC | 628.4 | 1484.4 | 409.3 |
| S1 | 720.0 | 1653.0 | 394.0 |
| S2 | 765.0 | 1727.0 | 312.0 |
| S3 | 867.7 | 2191.4 | 309.1 |
| S4 | 969.4 | 1946.9 | 208.2 |

*EPITEX ™ 66 polymer available from The Dow Chemical Company

Water and Sebum Repellency

Water and sebum repellency of a film are dominated by surface energy. High water and sebum repellency for a prolonged period is desired in a variety of applications, such as, for architectural coatings and for personal care applications (e.g., providing long lasting active deposition and rub-off resistance benefits, especially in color cosmetics, sunscreens and anti-pollution products). The water and sebum repellency can be evaluated by measuring the water contact angle and sebum contact angle from the surface of a film. Specifically, films were prepared from the product multistate polymers prepared according to Comparative Example SC and Examples S1-S4 by drawdown with a 3 mil or 6 mil doctor blade on a black plastic chart (available from LENETA P121-16). The drawn films were air dried in an environmental controlled room (72° F. and 50% RH) for at least 72 hours. The dried films were then placed into a fog box for at least 48 hours to remove any residual surfactants from the film surface. After treatment in the fog box, the films were air dried in an environmental controlled room (72° F. and 50% RH) at least 24 hours before making measurements. Both water and sebum contact angles were measured at approximately 4 seconds and at 250 seconds after water or sebum droplets were deposited on the substrate using a drop shape analyzer (Kruss DSA100). For the sebum contact angle measurement, an artificial sebum solution was prepared having the composition noted in TABLE 5. The results of the water and sebum contact angle measurements are provided in TABLE 6.

TABLE 5

| Ingredient | Weight % |
|---|---|
| Glyceryl trioleate[1] | 60 |
| Oleic acid[2] | 20 |
| Squalane[3] | 20 |

[1](65% solution) available from Sigma-Aldrich
[2](90% solution) available from Sigma-Aldrich
[3]available from Sigma-Aldrich

TABLE 6

| | Contact angle | | | |
|---|---|---|---|---|
| | Water | | Sebum | |
| Test Material Example | 0 s | 250 s | 0 s | 250 s |
| Control* | 73.1 | 68.7 | 19.4 | 10.4 |
| SC | 97.6 | 94.9 | 50.1 | 37.9 |
| S1 | 93.8 | 90.7 | 47.7 | 46.8 |
| S2 | 94.5 | 89.1 | 53.7 | 53.1 |
| S3 | 96.8 | 93.9 | 52.7 | 38.6 |
| S4 | 95.7 | 93.8 | 51.2 | 34.8 |

*EPITEX ™ 66 polymer available from The Dow Chemical Company

Formulation Example G1: Generic Color Cosmetic Formulation

Color cosmetic formulations were prepared having the generic formulations according to Formulation Example G1 noted in TABLE 7. The Phase A ingredients were added to a beaker and mixed until uniform. The Phase B ingredients were then slowly added to the contents of the beaker with mixing until uniform. The Phase C ingredients were combined in a separate container with mixing until uniform and then slowly added to the contents of the beaker with mixing. The Phase D Test Polymer was then slowly added to the contents of the beaker with mixing until uniform. The Phase E ingredient was then added to the contents of the beaker with mixing until uniform. The Phase F ingredient was then added to the contents of the beaker. The beaker contents were then mixed until uniform to provide the product color cosmetic formulation.

TABLE 7

| Phase | Ingredient INCI name | Parts by weight (pbW) |
|---|---|---|
| A | Isododecane[1] | 10.9 |
| A | Iron Oxide dimethicone[2] | 0.06 |
| A | Iron Oxide (CI 77491), dimethicone[3] | 0.23 |
| A | Iron Oxide (CI 77492), dimethicone[4] | 0.99 |
| A | Titanium Dioxide, dimethicone[5] | 0.85 |

TABLE 7-continued

| Phase | Ingredient INCI name | Parts by weight (pbW) |
|---|---|---|
| B | Lauryl PEG-10 Tris(trimethylsiloxy)silyl-ethyl Dimeticone[6] | 5.5 |
| B | Caprylyl Methicone[7] | 3.0 |
| C | Deionized water | 43 |
| C | Sodium chloride | 0.91 |
| C | Glycerin | 4.5 |
| C | Phenoxyethanol (and) Ethylhexylglycerin[8] | 0.91 |
| D | Test Polymer (on a polymer solids basis) | 4.5 |
| E | Isododecane[1] | 9.1 |
| F | Deionized water | q.s. 100 |

[1]Available from Presperse under the tradename Permethyl ® 99A.
[2]Available from Miyoshi America under tradename SAT-B-335198.
[3]Available from Miyoshi America under tradename SAT-R-338075.
[4]Available from Miyoshi America under tradename SAT-Y-338073.
[5]Available from Miyoshi America under tradename SAT-TRI-77891.
[6]Available from The Dow Chemical Company under the tradename Dowsil ™ ES-5300.
[7]Available from The Dow Chemical Company under the tradename Dowsil ™ FZ-3196.
[8]Available from Schulke Inc. under the tradename euxyl ® PE 9010.

Comparative Examples C1-C3 and Examples 1-4: Color Cosmetic Formulations

The color cosmetic formulations of Comparative Examples C1-C3 and Examples 1-4 were prepared according to Formulation Example G1 with varying Test Polymer as noted in Table 8.

Wear Resistance

The color cosmetic formulations prepared according to Comparative Examples C1-C3 and Examples 1-4 were each coated on white vinyl charts (available from Leneta) using a doctor blade film applicator with the gap set at 6 mils (0.1524 mm) and allowed to dry at 22° C. for at least 24 hours. The color reading of each sample was then measured using a color spectrophotometer from BYK-Gardner. The wear resistance of the deposited film of color cosmetic formulations was characterized by the change (ΔE) before and after abrasion with a pre-cut bath towel (55 mm×45 mm). The bath towel was fixed to a moving robotic part that moves back and forth periodically at a constant speed. The film was abraded by the bath towel by 3 wear cycles under a pressure of approximately 600 Pa, each wear cycle lasts 6 seconds. Readings were taken from ten points on each deposited film. The average of the ten readings from each film is provided in Table 8.

TABLE 8

| Example | Polymer | ΔE |
|---|---|---|
| Comp. Example C1 | Caprylyl Methicone[1] | 8.9 |
| Comp. Example C2 | Epitex ™ 66 | 5.1 |
| Comp. Example C3 | SC | 6.0 |
| Example 1 | S1 | 3.4 |
| Example 2 | S2 | 1.2 |
| Example 3 | S3 | 3.0 |
| Example 4 | S4 | 8.8 |

[1]Available from The Dow Chemical Company under the tradename Dowsil ™ FZ-3196.
[2] Polymer available from The Dow Chemical Company

We claim:

1. A multistage polymer, comprising:

(a) 75 to 82 wt %, based on weight of the multistage polymer, of an acrylate rich stage comprising:

82.17 to 94.68 wt %, based on weight of the acrylate rich stage, of structural units of a monoethylenically unsaturated non-ionic, acrylate rich stage monomer, wherein the monoethylenically unsaturated non-ionic, acrylate rich stage monomer is selected from a mixture of at least two $C_{1-4}$ alkyl (meth)acrylates;

4 to 16 wt %, based on weight of the acrylate rich stage, of structural units of a first carbosiloxane monomer of formula (I)

(I)

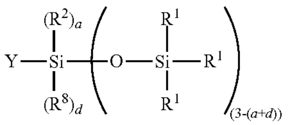

1.25 to 1.75 wt %, based on weight of the acrylate rich stage, of structural units of a monoethylenically unsaturated carboxylic acid, acrylate rich stage monomer; and 0.07 to 0.08 wt %, based on weight of the acrylate rich stage, of structural units of a multiethylenically unsaturated, acrylate rich stage monomer having at least two ethylenically unsaturated groups per molecule; and (b) 18 to 25 wt %, based on weight of the multistage polymer, of a carbosiloxane rich stage, comprising:

0 to 90 wt %, based on weight of the carbosiloxane rich stage, of structural units of a vinyl monomer; and 10 to 100 wt %, based on weight of the carbosiloxane rich stage, of structural units of a second carbosiloxane monomer of formula (I)

(I)

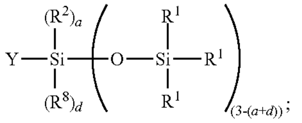

wherein a is 1; wherein d is 0; wherein each $R^1$ is a methyl group; wherein each $R^2$ is independently selected from the group consisting of a hydrogen and a $C_{1-10}$ alkyl group; wherein each $R^8$ is a —O—$Si(CH_3)_3$ group; wherein Y is of formula (II)

(II)

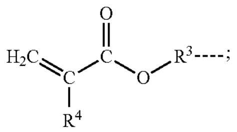

wherein each $R^4$ is independently selected from the group consisting of a hydrogen and a methyl group; wherein each $R^3$ is a $C_3$ alkylene group; and wherein the first carbosiloxane monomer of formula (I) and the second carbosiloxane monomer of formula (I) are the same or different.

2. The multistage polymer of claim 1, further comprising a carrier.

3. The multistage polymer of claim 2, wherein the carrier includes water.

4. The multistage polymer of claim 1, wherein the carbosiloxane rich stage comprises 19 to 21 wt %, based on weight of the carbosiloxane rich stage, of structural units of the vinyl monomer; and 79 to 81 wt %, based on weight of the carbosiloxane rich stage, of structural units of the second carbosiloxane monomer of formula (I).

5. The multistage polymer of claim 4, wherein the mono-ethylenically unsaturated non-ionic, acrylate rich stage monomer is a mixture of at least three $C_{1-4}$ alkyl (meth) acrylates.

6. The multistage polymer of claim 5, wherein the mono-ethylenically unsaturated non-ionic, acrylate rich stage monomer is a mixture of butyl acrylate, butyl methacrylate and methyl methacrylate.

7. The multistage polymer of claim 6, wherein the mono-ethylenically unsaturated carboxylic acid, acrylate rich stage monomer is selected from the group consisting of acrylic acid, methacrylic acid, itaconic acid, crotonic acid and mixtures thereof.

8. The multistage polymer of claim 7, wherein the multiethylenically unsaturated, acrylate rich stage monomer having at least two ethylenically unsaturated groups per molecule is selected from the group consisting of divinylbenzene (DVB), allyl methacrylate (ALMA), ethylene glycol dimethacrylate (EGDMA), hexane-1,6-diol diacrylate (HDDA), butylene glycol dimethacrylate (BGDMA) and mixtures thereof.

9. The multistage polymer of claim 8, wherein the vinyl monomer is selected from the group consisting of methyl methacrylate and methacrylic acid.

10. The multistage polymer of claim 9, wherein the first carbosiloxane monomer of formula (I) and the second carbosiloxane monomer of formula (I) are both MD'M-ALMA having the following structure

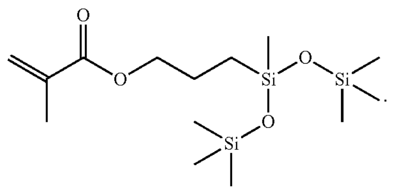 [SMILES: C=C(C)C(=O)OCCC[Si](C)(O[Si](C)(C)C)O[Si](C)(C)C]

11. A composition, comprising the multistage polymer of claim 3, wherein the composition is selected from the group consisting of a personal care formulation, a home care formulation, a coating, an oilfield servicing fluid, a civil engineering servicing fluid, a construction formulation and a pharmaceutical formulation.

12. The composition of claim 11, wherein the composition is a personal care formulation, wherein the personal care formulation further comprises at least one personal care active selected from the group consisting of a water proofing agent, an emollient, a preservative, an antioxidant, a fragrance, a deodorant, an antiperspirant active, a skin coolant, a humectant, a rheology modifier, an aesthetic modifier, a vitamin, a skin protectant, an oil, an emulsifier, a surfactant, a pearlizer, a consistency factor, a thickener, a super fatting agent, a stabilizer, a polymer, a silicone oil, a fat, a wax, a lecithin, a phospholipid, a filler, a light management powder or particle, a moisturizer, a cleanser, a sun care active, a hair treatment active, an anti-dandruff agent and a skin care active.

13. The composition of claim 11, wherein the composition is a coating, wherein the coating, further comprises at least one coating component selected from the group consisting of a film forming binder, anti-sag agents, leveling agents, curing promoters, an opacifier, a pigment, a rheology modifier, a wetting agent and a metal oxide.

14. The composition of claim 11, wherein the composition is a home care formulation, wherein the home care formulation, further comprises at least one home care active ingredient selected from the group consisting of a fragrance, an insect repellent, a deodorizer, a cleaning agent, a disinfecting agent, a laundry detergent, a laundry softening agent, a dishwashing detergent, a toilet bowl cleaning agent, a fabric sizing agent, a lubricating agent and a textile wipe.

15. The composition of claim 11, wherein the composition is an oilfield servicing fluid, wherein the oilfield servicing fluid, further comprises at least one of a clay, a xanthan gum, a starch, a polymer, an acid soluble carbonate salt, a sodium chloride and a rheology modifier.

16. The composition of claim 11, wherein the composition is a construction formulation, wherein the construction formulation, further comprises at least one of a cement, a concrete, an adhesive, a plaster, a mortar, a joint compound, a clay and a mica.

17. The composition of claim 11, wherein the composition is a pharmaceutical formulation, wherein the pharmaceutical formulation, further comprises an excipient, a biological active, a tableting material, an inactive ingredient, a binding agent, a time release agent, a flavoring agent and a colorant.

* * * * *